United States Patent Office.

ALFRED MONNIER, OF PHILADELPHIA, PENNSYLVANIA.

Letters Patent No. 78,001, dated May 19, 1868.

---

IMPROVED PROCESS OF SEPARATING COBALT AND NICKEL FROM OTHER ORES.

---

The Schedule referred to in these Letters Patent and making part of the same.

---

TO ALL WHOM IT MAY CONCERN:

Be it known that I, ALFRED MONNIER, of Philadelphia, in the State of Pennsylvania, have invented a new and useful Process for the Separation of Cobalt and Nickel from Iron and Manganese; and I do hereby declare that the following is a full and exact description of the same.

My invention is designed to facilitate the separation of cobalt and nickel from iron and manganese, all of these metals being in a state of solution, by the use of any of the alkaline sulphurets, such as the sulphurets of potassium, of sodium, of calcium of barium, or their equivalents.

To do this I proceed as follows: In a cold or slightly-heated solution, containing sulphates of nickel, cobalt, iron, and manganese, I add gradually, with constant stirring, a solution of an alkaline sulphuret, such as that of sodium, calcium, or the like, until the nickel and cobalt are precipitated.

I have found that with care all the cobalt and nickel will be separated first, then all the iron, and lastly the manganese, and each of them as a sulphuret. An exact separation of nickel and cobalt from iron and manganese can be effected by a careful addition of the alkaline sulphuret to the solution of those metals, and testing frequently the residual solution to ascertain when all the nickel and cobalt are precipitated. I prefer, however, to make the exact separation in one of two other ways, as follows:

First, I precipitate nearly all the nickel and cobalt, which I determine by frequent tests, rapidly performed, and then filter the liquor from the precipitate, and wash with water containing a little sulphuretted hydrogen. The precipitate is sulphuret of cobalt or nickel, or of both, and free from iron and manganese. The solution contains a little nickel and cobalt, which I precipitate together with a little iron, and after filtering off this precipitate I rework it with a fresh lot of ore.

Second, I precipitate with the alkaline sulphuret until no more nickel and cobalt remain in solution, and some iron has been precipitated. The liquor is filtered, and without waiting to wash the precipitate, after the liquor has merely drained off, I pour, over the precipitate, water acidulated with a little sulphuric or other acid, and then wash with sulphuretted hydrogen-water slightly acidulated with sulphuric or other acid. By this means every trace of iron is redissolved, and very little or no cobalt and nickel, because the sulphurets of nickel and cobalt are not readily dissolved in cold dilute acids.

In order to avoid possible loss, however, I add this last solution to a new lot of the original solution of the mixed metals. The test I employ to ascertain when all nickel and cobalt are thrown down from solution by an alkaline sulphuret solution, is to add a little alkaline sulphuret to the solution to be tested, made neutral or alkaline if necessary, and then to acidulate it with sulphuric or other acid, and observing whether the solution, made milky by precipitated sulphur, has any black particles floating in it or not. If, after acidulating, black particles float in it, then nickel or cobalt, or both, were in the solution; if not, there was no nickel or cobalt present.

The precipitated sulphuret of nickel or cobalt, or of both, obtained free from the other metals, as above described, is then treated to further separate nickel and cobalt from each other, if required, by methods known and practised by refiners of nickel and cobalt.

Instead of using any of the sulphurets mentioned, the addition of a certain amount of an alkali, or an alkaline earth, and subsequent impregnation with sulphuretted hydrogen gas, will effect the object in view; but I prefer the method first described, since it is more easily executed, and more exact.

What I claim, and desire to secure by Letters Patent, is—

The treatment of a solution of cobalt, nickel, iron, and manganese, for the purpose of separating either one or both of the two former from either one or both of the two latter metals, substantially as herein set forth.

ALFRED MONNIER.

Witnesses:
  J. H. MYERS,
  GEORGE E. BUCKLEY.